United States Patent [19]

de Oliveira et al.

[11] Patent Number: 5,004,937
[45] Date of Patent: Apr. 2, 1991

[54] CIRCUIT CONFIGURATION FOR ACCELERATED CHARGE REVERSAL OF THE VOLTAGE LEVEL OF A BUS LINE OF AN INTEGRATED CIRCUIT

[75] Inventors: Antonio M. d. A. de Oliveira, Munich; Jakob Staerk, Karlsfeld, both of Fed. Rep. of Germany

[73] Assignee: Siemens Aktiengesellschaft, Munich, Fed. Rep. of Germany

[21] Appl. No.: 186,374

[22] Filed: Apr. 26, 1988

[30] Foreign Application Priority Data

Apr. 28, 1987 [DE] Fed. Rep. of Germany ....... 3714134
Dec. 23, 1987 [DE] Fed. Rep. of Germany ....... 3743932

[51] Int. Cl.$^5$ .................... H03K 17/16; H03K 19/003
[52] U.S. Cl. .................................. 307/443; 307/453; 307/475; 307/241; 307/246
[58] Field of Search ............... 307/443, 448, 453, 475, 307/481, 246, 540, 568, 550, 555, 549, 263, 530; 365/203–204

[56] References Cited

U.S. PATENT DOCUMENTS

| | | | |
|---|---|---|---|
| 3,774,053 | 11/1973 | Carlson | 307/443 |
| 4,486,753 | 12/1984 | Saeki et al. | 307/568 |
| 4,488,066 | 12/1984 | Shoji | 307/452 X |
| 4,498,021 | 2/1985 | Uya | 307/443 |
| 4,621,202 | 11/1986 | Pumo | 307/468 X |
| 4,707,623 | 11/1987 | Bismarck | 307/475 |

FOREIGN PATENT DOCUMENTS 0082980 7/1983 European Pat. Off. .
0138651 4/1985 European Pat. Off. .
0175526 3/1986 European Pat. Off. .
3228013 3/1983 Fed. Rep. of Germany .

Primary Examiner—Timothy P. Callahan
Attorney, Agent, or Firm—Herbert L. Lerner; Laurence A. Greenberg

[57] ABSTRACT

A circuit configuration includes data transmitters, data receivers and a bus line of an integrated circuit being divided into N line segments. Each of the line segments is connected to a respective one of the data transmitters and to a respective one of the data receivers for data transmission between the data transmitters and the data receivers. The bus line is charged to a predetermined electrical voltage level during a pre-charging phase, and the bus line has a voltage level being left as is or reversed within a charge reversal period during a data transmission phase in accordance with digital data to be transmitted. A trigger circuit is connected to the bus line for accelerated charge reversal of the bus line. The trigger circuit effects an additional, accelerated discharging or charging of the bus line upon attainment of a predetermined trigger level. The trigger circuit includes a logic gate having a plurality of inputs and an output. Switch elements are each connected between a respective one of the N line segments of the bus line and a respective one of the inputs of the logic gate for comparing the trigger level with a voltage level at that time. The switch elements and the logic gate may be replaced by a NAND element having N inputs. Discharge transistors are connected to and triggered by the output of the logic gate for rapid individual charge reversal of each of the line segments.

2 Claims, 3 Drawing Sheets

CIRCUIT CONFIGURATION FOR ACCELERATED CHARGE REVERSAL OF THE VOLTAGE LEVEL OF A BUS LINE OF AN INTEGRATED CIRCUIT

The invention relates to a circuit configuration in a bus line of an integrated circuit for data transmission between data transmitters and data receivers, in which the bus line is charged to a predetermined electrical voltage level during a pre-charging phase, and during a data transmission phase the voltage level of the bus line is left as it is, or is reversed within a charge reversal period or phase, in accordance with the digital data to be transmitted.

In integrated circuits, all of the data transmitters (such as working memories) and all of the data receivers (such as a central processing unit) are connected to a common bus for data transmission, which may be divided along an address bus, data bus and control bus. Depending on the operating system on which it is based, each bus includes a plurality of bus lines, which are pre-charged for data transmission to a predetermined electrical voltage level such as $V_{CC}$, during a so-called pre-charging phase. Preferably this voltage level is already in the vicinity of one of the binary logic levels L (low) or H (high), so that the bus line need not have its charge reversed to transmit the logic level.

A charge reversal of the bus line is always necessary whenever the opposite logic level must be transmitted. In order not to impair the operating speed of a microcomputer, the charge reversal must be completed within the briefest possible time, while taking into account sufficient signal-to-noise ratios and assuring reliable status recognition.

With increasingly high scales of integration, longer bus lines with greater bus line capacities necessarily result, and if the charge reversal controls were unchanged, this would lead to longer charge reversal times and therefore lower transmission rates.

In order to solve these problems, circuits are disclosed, for instance in German Published, Non-Prosecuted Application DE-OS 32 28 013 A1 and U.S. Pat. No. 4,498,021, which leave the voltage level of the bus line as it is, or reverse the charge within the charge reversal phase by means of trigger circuits, which effect an additional discharge or charge of the bus line upon attaining a predetermined trigger level, in accordance with the data to be transmitted.

It is accordingly an object of the invention to provide a circuit configuration for accelerated charge reversal of the voltage level of a bus line of an integrated circuit, which overcomes the hereinafore-mentioned disadvantages of the heretofore-known devices of this general type and to connect a trigger circuit to a bus line, which even further shortens the necessary charge reversal time from one of the binary level states to the other.

With the foregoing and other objects in view there is provided, in accordance with the invention, a circuit configuration, comprising data transmitters, data receivers, a bus line of an integrated circuit being divided into N line segments, each of the line segments being connected to a respective one of the data transmitters and to a respective one of the data receivers for data transmission between the data transmitters and the data receivers, the bus line being charged to a predetermined electrical voltage level during a pre-charging phase, and the bus line having a voltage level being left as is or reversed within a charge reversal period or phase during a data transmission phase in accordance with digital data to be transmitted, a trigger circuit connected to the bus line for accelerated charge reversal of the bus line, the trigger circuit effecting an additional, accelerated discharging or charging of the bus line upon attainment of a predetermined trigger level, the trigger circuit including a logic gate having a plurality of inputs and an output, switch elements each being connected between a respective one of the N line segments of the bus line and a respective one of the inputs of the logic gate for comparing the trigger level with a voltage level at that time, and discharge transistors being connected to and triggered by the output of the logic gate for rapid individual charge reversal of each of the line segments.

With the objects of the invention in view, there is also provided a circuit configuration, comprising data transmitters, data receivers, a bus line of an integrated circuit being divided into N line segments, each of the line segments being connected to a respective one of the data transmitters and to a respective one of the data receivers for data transmission between the data transmitters and the data receivers, the bus line being charged to a predetermined electrical voltage level during a pre-charging phase, and the bus line having a voltage level being left as is or reversed within a charge reversal period or phase during a data transmission phase in accordance with digital data to be transmitted, a trigger circuit connected to the bus line for accelerated charge reversal of the bus line, the trigger circuit effecting an additional, accelerated discharging or charging of the bus line upon attainment of a predetermined trigger level, the trigger circuit including a NAND element having an output and having N inputs each being connected to a respective one of the N line segments of the bus line for comparing the trigger level with a voltage level at that time, and discharge transistors being connected to and triggered by the output of the NAND element for rapid individual charge reversal of each of the line segments.

In accordance with another feature of the invention, the trigger level is defined by dimensioning of the NAND element.

The signal for charge reversal of the bus line, which initially always appears in only one line segment, is transmitted to the remaining line segments by the trigger circuit. To this end, in accordance with the invention all of the line segments are linked through the logic gate in such a way that an accelerated individual charge reversal of all of the line segments takes place.

The trigger level should be selected in such a way that it is attained without delay, and in any case as soon possible after the beginning of the charge reversal phase, without sharply reducing the signal-to-noise ratio.

Therefore, in accordance with a concomitant feature of the invention, the switch elements or the NAND element select a trigger level attained without delay, and without considerably lowering a signal-to-noise ratio between logic levels.

By dividing the bus line into N line segments, the effective bus line capacity can be reduced to 1/N of the initial or output capacity and thus the charge reversal time can also be reduced in turn to approximately 1/N of the charge reversal time which has already been shortened by prior art trigger circuit configurations. Other features which are considered as characteristic for the invention are set forth in the appended claims.

Although the invention is illustrated and described herein as embodied in a circuit configuration for accelerated charge reversal of the voltage level of a bus line of an integrated circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 3:
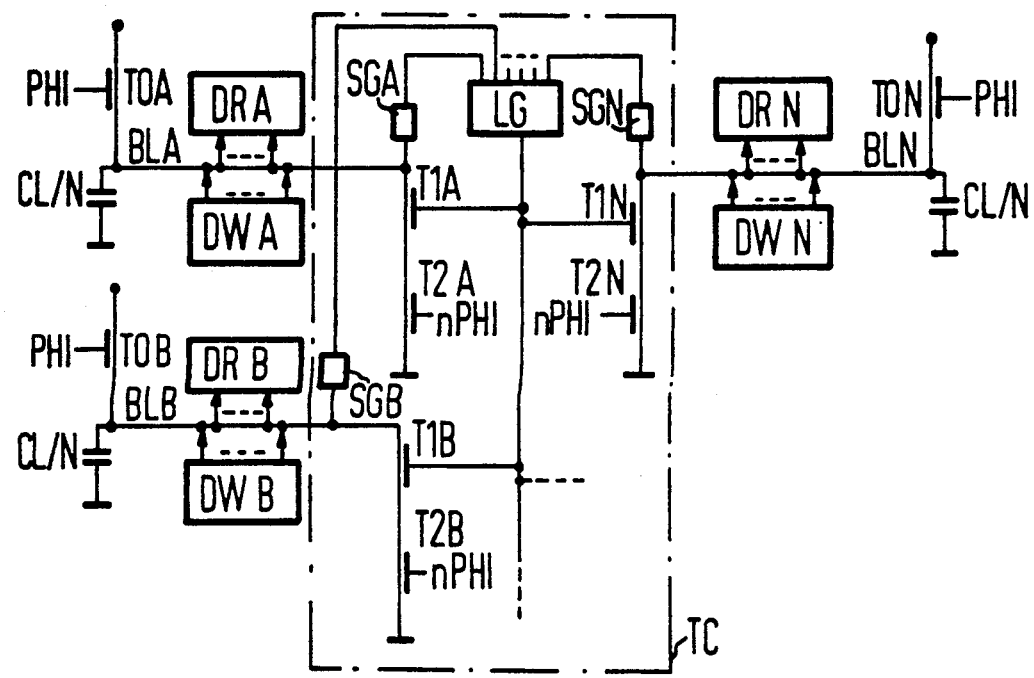
FIG. 3 is a schematic and block circuit diagram of a circuit configuration according to the invention for a bus line divided into N segments.
Figure 4:
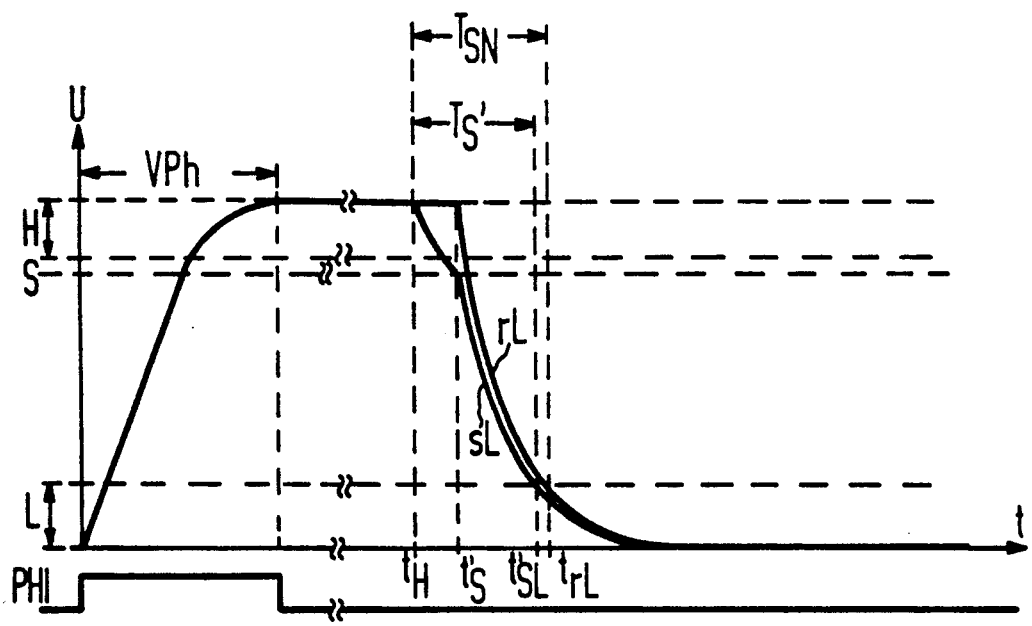
Figure 5:
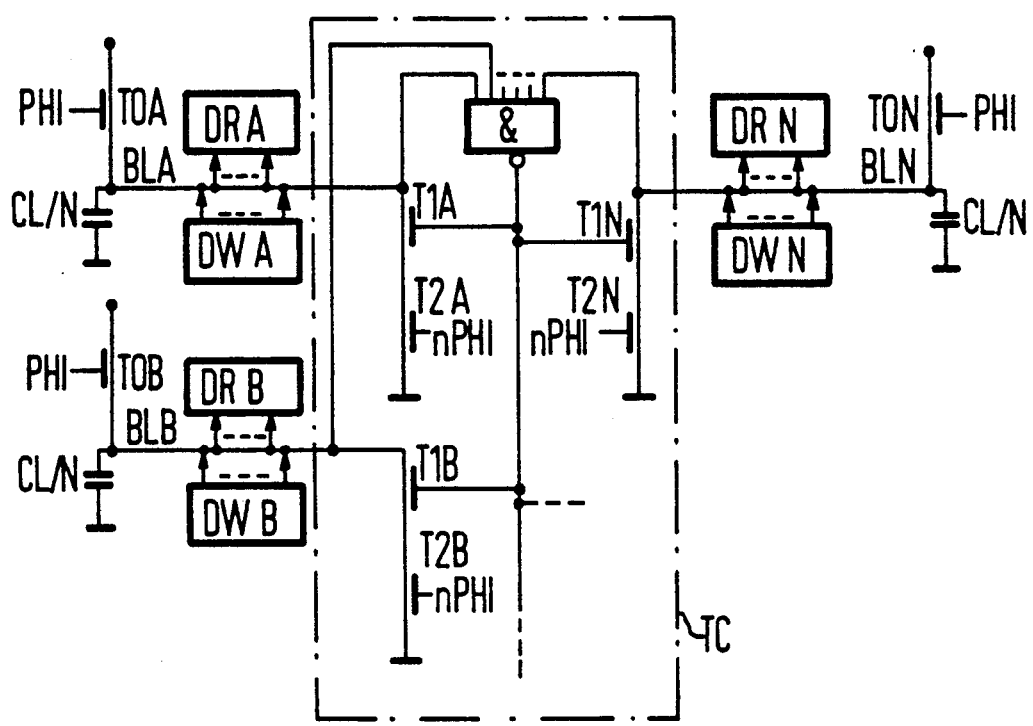

FIG. 4 is a graph of the voltage course attainable with the circuit configuration of FIG. 3; and FIG. 5 is a view similar to FIG. 3 of a further circuit configuration according to the invention for a bus line divided into N segments. Referring now to the figures of the drawings in detail and first, particularly, to FIG. 1 thereof, there are seen data transmitters DW1-DWY and data receivers DR1-DRX connected to a bus line BL having a bus capacity CL. The bus line is precharged to a predetermined voltage level through a pre-charging transistor T0, which is also connected to the bus line BL. A trigger circuit TC connected to the bus line BL includes a switch element SG, which compares the voltage level with a trigger level S and has an output which acts upon a discharging transistor T1. A blocking transistor T2 is in turn connected to the output of the discharging transistor T1.

The mode of operation of the circuit configuration of FIG. 1 will now be explained while referring to FIG. 2, which shows the voltage course on the bus line BL during a pre-charging phase VPh and an ensuing charge reversal period or phase.

During the pre-charging phase VPh, a supply voltage is applied to the bus line BL through the pre-charging transistor T0, which is triggered through a charging signal PHI. The supply voltage is thus raised to an internal operating logic level, which is H. In order to preclude a short circuit between different potentials, an inverse charge signal nPHI is applied to the gate of the blocking transistor T2. Upon attaining the logic level H, the bus line is finally ready for transmitting a binary H.

However, should a binary L be present for transmission, then the bus line BL must first be reversed to the voltage level L. This charge reversal is tripped at a time $t_H$ by non-illustrated charge reversal control means. Without the trigger circuit TC, the voltage level thus drops from H to L in accordance with a charge reversal curve oTC shown in broken lines and attains the L state at a time $t_L$. However, the prior art trigger circuit TC causes the discharging transistor T1 to switch through upon attaining the trigger level S, which in turn causes the bus line BL to reverse its charge in accelerated fashion in accordance with a charge reversal curve mTC, so that it already reaches the L level by a time $t_{SL}$. The discharge time is thereby shortened from $T = t_L 31 t_H$ to $T_S = t_{SL} - t_H$.

Figure 1:
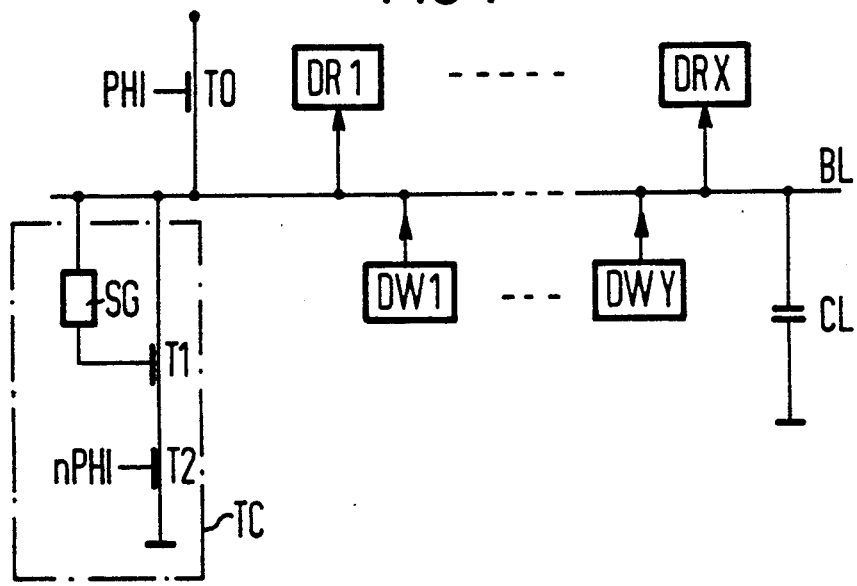
FIG. 1 is a schematic and block circuit diagram of a prior art circuit configuration connected to a bus line of an integrated circuit.
Figure 2:
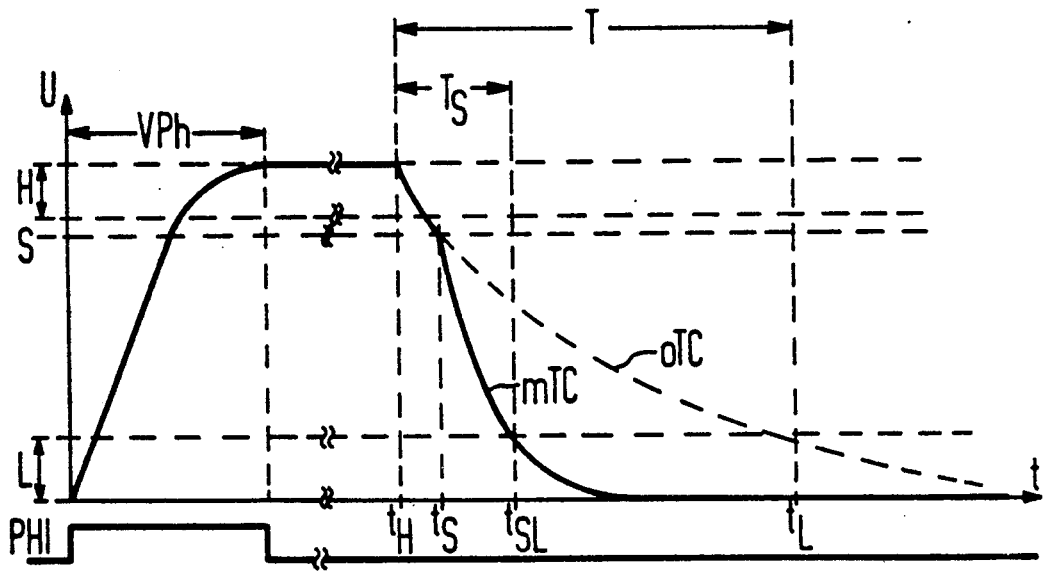
FIG. 2 is a graph of the voltage course attainable with the circuit configuration of FIG. 1.

In distinction to the heretofore known circuit configuration of FIGS. 1 and 2, the embodiment illustrated in FIG. 3 has a bus line divided into N line segments having bus capacities CL/N and being connected to a common trigger circuit TC. Each of the N line segments BLA, BLB ... BLN is assigned a respective data transmitter DWA, DWB, ..., DWN, a data receiver DRA, DRB, ..., DRN and a pre-charging transistor TOA, TOB, ..., TON. The trigger circuit TC includes discharging transistors T1A, T1B, ..., T1N, switch elements SGA, SGB, ..., SGN, a logic gate LG and blocking transistors T2A, T2B, ..., T2N. The blocking transistors are in turn subjected to the inverse charge signal nPHI, in order to protect the circuit configuration.

The outputs of the various switch elements SGA, SGB, ..., SGN are linked to the logic gate LG in such a way that the output signal thereof acts upon the discharge transistors T1A, T1B, ..., T1N and leads to an accelerated individual charge reversal of all N line segments.

The voltage course of the circuit configuration of FIG. 3 is plotted in FIG. 4. Similar to the embodiment illustrated in FIG. 1, in the circuit configuration of FIG. 3, the line segments BLA, BLB, ..., BLN are also charged during a pre-charging phase VPh to the logic level H through the various pre-charging transistors TOA, TOB, ..., TON, by switching the pre-charging transistors TOA, TOB, ..., TON at low resistance through the charge signal PHI. Meanwhile, the blocking transistors T2A, T2B, ..., T2N in turn are in the high-resistance state thereof, as dictated by the inverse charge signal nPHI. Although the bus line is divided into N line segments in this circuit configuration, it is nevertheless possible for the logic level H to be sent from each data transmitter of one line segment to any arbitrary data receiver, that is even to the data receiver of some other line segment.

The voltage level of all N line segments must be reversed for transmission of the logic level L. This charge reversal is tripped by the writing data transmitter at the time $t_H$. However, since the writing data transmitter always belongs to only one line segment, initially only the voltage level of the writing line segment sL is reduced, while the remaining line segments rL still remain at the initial or output voltage level. However, as soon as the dropping voltage level has attained the trigger level S of the switch element SG belonging to the writing line segment SL at a time $t'_S$, the output thereof switches through to the logic gate LG. All of the discharge transistors T1A, T1B, ..., T1N are then opened by this gate, and the accelerated charge reversals of the remaining line segments rL are initiated. The writing line segment sL thus already attains the lower voltage level of the logic level L at a time $t'_{sL}$, while the remaining line segments rL only follow at a later time $t_{rL}$ because of the somewhat higher initial or output level.

FIG. 5 shows a further circuit configuration according to the invention in which, as in the embodiment of FIG. 3, the bus line is divided into N line segments and is connected to a common trigger circuit TC. Once again, the trigger circuit TC includes discharge transistors T1A, T1B, ..., T1N and blocking transistors T2A, T2B, ..., T2N. The blocking transistors are again subjected to the inverse charge signal nPHI, for protection of the circuit configuration. However, in the embodiment shown in FIG. 5, the switch elements and the logic gates are replaced with a NAND element having N inputs. When a NAND element is used, it is in fact possible to dispense with separate switch elements, since an internal trigger level can be established in a suitable embodiment of the NAND element, such as by means of dimensioning input transistors.

With the circuit configurations of FIGS. 3 and 5 according to the invention, discharge times $T_{SN}$ of the remaining line segments rL are somewhat longer than the discharge time of the writing line segment $T'_S$, but overall there is a considerable reduction in the total discharge time, because the capacity of each line amounts to only 1/N of the total capacity CL with N line segments. The discharge time $T_{SN}$ of a bus line divided into N segments having a trigger circuit TC is thus only approximately 1/N of the discharge time $T_S$ of an undivided bus line BL having a trigger circuit.

We claim:

1. Circuit configuration, comprising a plurality of data transmitters, data receivers, a bus line of an integrated circuit being divided into N line segments each having a voltage level, each of said line segments being connected to a respective one of said data transmitters and to a respective one of said data receivers for data transmission between said data transmitters and said data receivers, said bus line being charged to a predetermined electrical voltage level during a pre-charging phase, and said bus line having a voltage level being left as is or reversed within a charge reversal period during a data transmission phase in accordance with digital data to be transmitted, a trigger circuit connected to said bus line for accelerated charge reversal of said bus line, said trigger circuit effecting an additional, accelerated discharging or charging of said bus line upon attainment of a predetermined trigger level, said trigger circuit including a logic gate having a plurality of inputs and an output, a plurality of switch elements each being connected between a respective one of said N line segments of said bus line and a respective one of said inputs of said logic gate for comparing the trigger level with said voltage level on said line segment, and discharge transistors being connected to and triggered by said output of said logic gate for rapid individual charge reversal of each of said line segments.

2. Circuit configuration, comprising a plurality of data transmitters, data receivers, a bus line of an integrated circuit being divided into N line segments, each having a voltage level, each of said line segments being connected to a respective one of said data transmitters and to a respective one of said data receivers for data transmission between said data transmitters and said data receivers, said bus line being charged to a predetermined electrical voltage level during a pre-charging phase, and said bus line having a voltage level being left as is or reversed within a charge reversal period during a data transmission phase in accordance with digital data to be transmitted, a trigger circuit connected to said bus line for accelerated charge reversal of said bus line, said trigger circuit effecting an additional, accelerated discharging or charging of said bus line upon attainment of a predetermined trigger level, said trigger circuit including a NAND element having an output and having N inputs each being connected to a respective one of said N line segments of said bus line for comparing the trigger level with said voltage level of said line segment, and discharge transistors being connected to and triggered by said output of said NAND element for rapid individual charge reversal of each of said line segments.

* * * * *